(12) United States Patent
LeBlanc et al.

(10) Patent No.: US 8,955,430 B2
(45) Date of Patent: Feb. 17, 2015

(54) METERING PROCESS AND DEVICE FOR PERFORMING THE PROCESS

(75) Inventors: Aladain Joseph LeBlanc, The Woodlands, TX (US); Donald Ray Wade, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 442 days.

(21) Appl. No.: 13/095,699

(22) Filed: Apr. 27, 2011

(65) Prior Publication Data

US 2012/0272838 A1     Nov. 1, 2012

(51) Int. Cl.
| | |
|---|---|
| *B30B 13/00* | (2006.01) |
| *B01F 3/12* | (2006.01) |
| *B01F 13/10* | (2006.01) |
| *C09K 8/08* | (2006.01) |
| *C09K 8/68* | (2006.01) |
| *B30B 11/02* | (2006.01) |
| *B30B 15/30* | (2006.01) |
| *E21B 21/06* | (2006.01) |

(52) U.S. Cl.
CPC ........... *B01F 3/1221* (2013.01); *B01F 13/1044* (2013.01); *C09K 8/08* (2013.01); *C09K 8/68* (2013.01); *B30B 11/025* (2013.01); *B30B 15/302* (2013.01); *E21B 21/062* (2013.01); *B01F 2013/1086* (2013.01); *B01F 2215/0081* (2013.01)
USPC .............................................. 100/35; 100/39

(58) Field of Classification Search
USPC ....... 100/35, 37, 70 R, 73, 106, 126, 39, 179, 100/240, 245, 906, 909
See application file for complete search history.

(56) References Cited

U.S. PATENT DOCUMENTS

| | | | |
|---|---|---|---|
| 2,985,099 A | | 5/1961 | Thomas |
| 3,256,181 A | * | 6/1966 | Zingg et al. .................. 366/142 |
| 3,386,372 A | * | 6/1968 | Knipp ............................ 100/35 |
| 5,203,261 A | | 4/1993 | Davis |
| 5,322,009 A | * | 6/1994 | Retrum .......................... 100/96 |
| 5,326,511 A | | 7/1994 | Cooper et al. |
| 5,623,811 A | * | 4/1997 | Hirschek et al. ............... 53/436 |
| 5,667,012 A | | 9/1997 | Hoover et al. |
| 6,089,147 A | | 7/2000 | Rodriguez et al. |

OTHER PUBLICATIONS

Partial International Search Report Issued in PCT/US2012/033962 and dated Jul. 18, 2012.
International Search Report & Written Opinion Issued in PCT/US2012/033962 and dated Oct. 18, 2012.

* cited by examiner

*Primary Examiner* — Jimmy T Nguyen
(74) *Attorney, Agent, or Firm* — Parsons Behle & Latimer

(57) ABSTRACT

An apparatus for compacting a divided material is disclosed. The apparatus comprises a chamber. The chamber includes an opening at one end. A valve is positioned proximate the opening. The apparatus further includes a container capable of dispensing a divided material into the chamber. A plunger is configured to compact the material into the chamber when the valve is closed. The plunger is also capable of pushing the compacted material through the opening and out of the chamber when the valve is open. A process and system for metering a material are also disclosed.

17 Claims, 2 Drawing Sheets

METERING PROCESS AND DEVICE FOR PERFORMING THE PROCESS

BACKGROUND

The present disclosure relates generally to processes and devices for compacting divided materials to allow metering of the resulting compacted materials.

Well servicing fluid ingredients can often be in the form of divided material, such as powders, flakes and so forth. For example, polymers often can be purchased in divided material form, and are well known for use in oil and gas well treatment fluids, such as hydraulic fracturing fluids, packer fluids, and fluid loss control pills, as well as other applications. The polymers are generally mixed with a carrier fluid in a specific polymer to carrier fluid ratio in order to achieve desired fluid properties. The carrier fluid is often an aqueous based fluid, such as a brine, although other fluids, such as alcohols and other hydrocarbons, are also known.

Divided materials such as powders or flakes allow for ease of hydration. However, they can be difficult to accurately meter. One solution for addressing this problem in the past has been to mix a desired weight of, for example a polymer powder or flake, with a quantity of mineral oil to form a polymer slurry with known properties. Because the polymer slurry is a liquid, it can be accurately measured using liquid flow meters. The disadvantage of this method is the cost of the mineral oil and logistics of handling the polymer slurry.

Other known techniques for metering dry divided material, such as polymer powders or flakes, employ mechanical means, such as augers, vibrating feeders, loss-in weight feeders, or rotary air locks. While these mechanisms provide a degree of rate control, they fail to provide an accurate volumetric flow rate measurement of the dry product. Augers, vibrating feeders and rotary air locks provide volumetric flow measurements. However, these metering devices may not be as accurate due to, for example, variations in bulk densities of the divided material product.

Weight feeders, such as loss-in weight feeders, can be accurate assuming they are calibrated correctly. Even so, it would be advantageous to provide for a volumetric feeder with improved accuracy.

The present disclosure is directed to overcoming, or at least reducing the effects of, one or more of the issues set forth above.

SUMMARY

An embodiment of the present disclosure is directed to an apparatus comprising a chamber. The chamber includes an opening at one end. A valve is positioned proximate the opening. The apparatus further includes a container capable of dispensing a divided material into the chamber. A plunger is configured to compact the divided material into the chamber when the valve is closed. The plunger is also capable of pushing the compacted material through the opening and out of the chamber when the valve is open.

Another embodiment of the present disclosure is directed to a process for metering a material. The process comprises providing a divided material having a bulk density. The divided material is compacted until it reaches a second density that is greater than the bulk density. A desired amount of the compacted material is then metered out. The term "compacted material" as used herein refers to the divided material after it has been compacted.

Yet another embodiment of the present disclosure is directed to a system for metering material and introducing the material into a hydrocarbon well. The system comprises an apparatus configured to compact a divided material into a compacted material; a reducing device configured for processing the compacted material to allow for an increased hydration rate of the material compared to the hydration rate of the compacted material; a mixing device configured to mix the material with a carrier fluid; and a pumping system in fluid communication with a hydrocarbon well. The pumping system is configured to pump the material and fluid carrier mixture into the hydrocarbon well.

Figure 1:
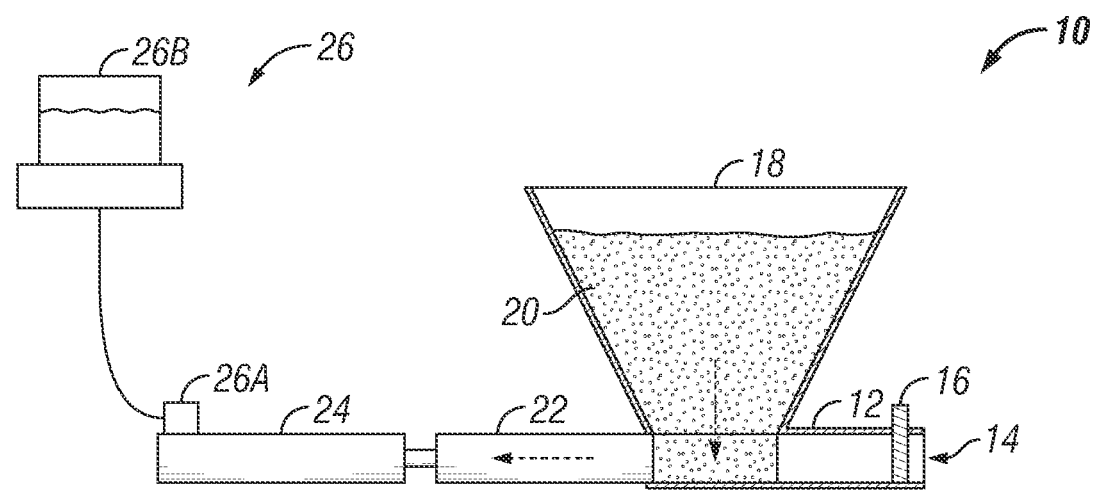
FIGS. 1 to 3 illustrate schematic views of an apparatus compacting a divided material to form a compacted material, according to an embodiment of the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 illustrates an apparatus 10 for compacting a divided material, according to an embodiment of the present disclosure. Apparatus 10 comprises a chamber 12. The chamber 12 comprises an opening 14 at one end. A valve 16 is positioned proximate the opening 14. A container 18 is positioned so as to be capable of dispensing the divided material 20 into the chamber 12.

Figure 4:
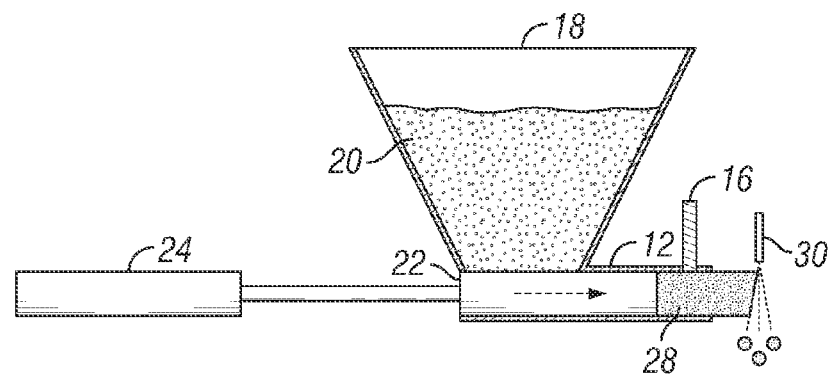
FIG. 4 illustrates the apparatus of FIGS. 1 to 3 metering the compacted material and reducing the material with a reducing device, according to an embodiment of the present disclosure.

A plunger 22 is configured to compact the dispensed divided material 20 into the chamber 12 when the valve 16 is in a closed position. In an embodiment, the plunger 22 can also be configured to be capable of pushing the resulting compacted material 28 through the opening 14 and out of the chamber 12 when the valve 16 is in an open position, as shown in FIG. 4.

The plunger 22 can be configured to compact the divided material at any suitable pressures. For example, the pressures can range from about 3 psi to about 5000 psi. Any device suitable for driving the plunger 22 with a force sufficient to provide the desired pressures can be employed. For example, a hydraulic ram 24 can be used to drive the plunger 22, as illustrated in FIG. 1. Alternatively, an electric powered ball screw or any other electric or pneumatic compaction device that is capable of driving the plunger 22 can be employed.

The chamber 12 can have any suitable shape that will allow compaction of the material therein. Examples include a cylindrical chamber, or a chamber with a square, rectangular or other suitably shaped cross-section.

The container 18 can be configured in any suitable manner that will provide for dispensing of the divided material into the chamber 12. For example, the chamber 12 can be a hopper capable of dispensing a divided material into the chamber 12 by gravity feed, as illustrated in FIG. 1. Any other suitable means for dispensing the divided material into the chamber 12 can also be employed. An example of an alternative well known means for dispensing the divided material would be a conveyer, such as a belt feeder.

In an embodiment, the apparatus 10 of FIG. 1 further comprises a metering system 26 configured to allow a user to regulate the volumetric rate at which compacted material 28 is pushed from the opening 14. The metering system 26 can be capable of allowing a user to adjust the volumetric rate to within desired specifications. One example of a metering system 26 can include a hydraulic ram 24 outfitted with a position feedback system 26A. The position feedback system can provide feedback to a microprocessor 26B or other device that can allow a user to accurately control the rate at which the compacted material 28 is forced from the chamber 12. Hydraulic rams with position feedback are well known in the art. Any other suitable means for metering the material from the chamber 12 could also be employed.

The present disclosure is also directed to a process for metering a material 20. The process can comprise providing a compactable, divided material 20 having a bulk density. The divided material can then be compacted until the material reaches a second density that is greater than the bulk density. The compacted material 28 can then be metered out as desired.

FIGS. 1 to 4 illustrate an example of a process for metering material, according to an embodiment of the present disclosure. As illustrated in FIG. 1, the divided material is provided in container 18. The term divided material as used herein means any divided solid or divided semi-solid that is capable of being compacted so as to increase its bulk density. Any divided material, such as powders, flakes, granules or pellets can be employed.

In an embodiment, the divided material can be for use in well servicing fluids for oil or gas wells. For example, the divided material can be polymers that can be used to viscosify a well servicing fluid, control the friction flow of the fluid, control loss of fluid to the formation, or control another fluid property. In an embodiment, the viscosifying, friction flow control and/or fluid loss control polymers can be water soluble. Examples of suitable viscosifying and/or fluid loss control polymers include crosslinkable, anionic, cationic and nonionic polysaccharides. Many polysaccharides are well known for use in hydrocarbon wells.

Examples of polysaccharides include gaur gum and derivatives thereof, such as, hydroxypropyl guar, carboxymethyl hydroxypropyl guar and its salts, natural gums, such as xanthan gum, gellan gum, locust bean gum, welan gum, galactomannan gum, rhamsan gum, gum ghatti, gum karaya, gum tragacanth and gum arabic and derivatives thereof; starch and derivatives thereof, such as carboxymethyl starch, carboxyethyl starch, hydroxyethyl starch, hydroxypropyl starch, carboxymethyl hydroxyethyl starch, alkylcarboxyalkyl starch, alkylcarboxyalkyl hydroxyalkyl starch, methyl starch, ethyl starch, propyl starch and derivatives thereof; carrageen gum, chitan, derivatives of chitan such as chitosan, cellulose and cellulose derivatives, such as alkylcellulose, hydroxyalkyl cellulose, alkylhydroxyalkyl cellulose, carboxyalkyl cellulose derivatives, alkyl carboxyalkyl cellulose, akyl carboxyalkyl hydroxyalkyl cellulose. Other examples of the cellulose derivatives include methyl cellulose, ethyl cellulose, propyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethyl cellulose, carboxymethyl cellulose and carboxymethyl hydroxyethyl cellulose. Derivatives of any of the above celluloses can also be used, including hydroxyalkylcellulose grafted with vinyl phosphonic acid and its salts, such as hydroxyethylcellulose or hydroxypropylcellulose grafted with vinyl phosphonic acid and salts thereof.

Other examples of suitable polymers include polyvinyl alcohol, polyimide, polyamine, quaternary polyamine, quaternary ammonium polymer, polyacrylate, polypyrrolidone, polyacrylamide and mixtures thereof. Still other examples of polymers are disclosed in copending U.S. patent application Ser. No. 13/044,192, the disclosure of which is hereby incorporated by reference in its entirety.

The divided material can also be a material other than a polymer. For example, breakers, paraffins and other substances employed in hydrocarbon well servicing fluids can be metered using the apparatus of the present disclosure.

With the plunger 22 in a retracted position, as shown in FIG. 1, divided material 20 is dispensed from container 18 into chamber 12. The dispensing can occur by gravity feed or other suitable means.

Figure 2:
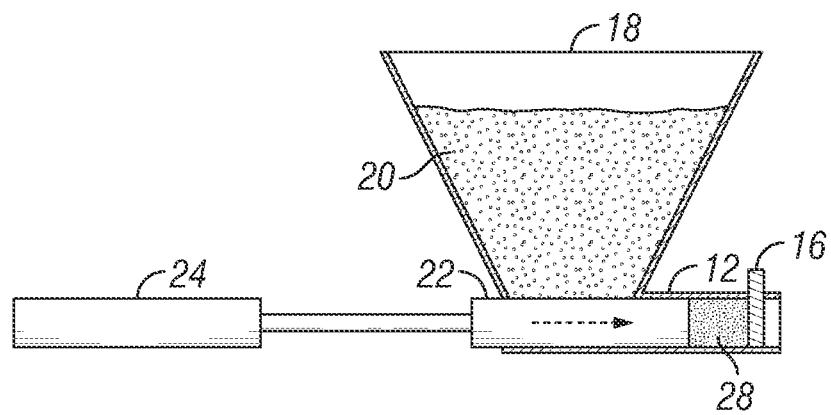
Figure 3:
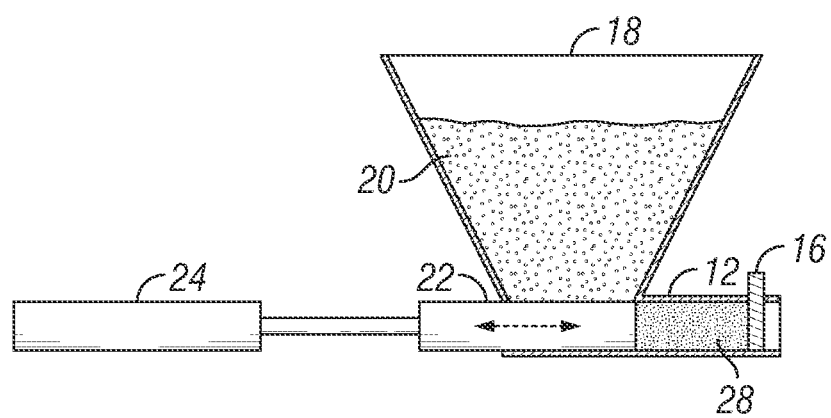

As illustrated in FIG. 2, with the valve 16 in the closed position, the plunger 22 can be driven forward to compact the divided material 20. The first amount of divided material 20 can be compacted to partially fill the chamber 12. This process can be repeated, with the plunger 22 being retracted, additional divided material 20 being added to the chamber 12, and then the plunger 22 being driven forward to compact the additional amount of divided material 20 into the chamber 12. The process can be repeated until a desired amount of divided material 20 is compacted in the chamber 12, as illustrated in FIG. 3. During the compaction process, valve 16 remains closed.

The divided material 20 can be compacted with sufficient pressure to form a solid or semi-solid material. The resulting compacted material 28 can have a relatively uniform, known density. This generally can be accomplished by removing the majority of air from the material during compaction. For example, the divided material 20 can have a first volume of air, while the compacted material 28 has a second volume of air, where the second volume of air ranges from about 5% to about 25% of the first volume of air or less. By compacting sufficiently to remove a majority of air and thereby form a material of known density, the ability to accurately meter the compacted material 28 by volumetric techniques may be improved compared to metering the divided material 20, which may have an inconsistent or unknown bulk density.

In determining the compaction pressure to be employed, there may be a pressure above which the compacted material 28 does not significantly increase in density. Therefore, compacting at or above this pressure could allow forming a material of uniform, known density without the need for determining the exact compaction pressure that will result in the desired density of the compacted material 28. Any compaction pressure can be employed at which a desired density is achieved.

After the desired amount of divided material is compacted into chamber 12, the valve 16 is opened and the plunger 22 can be used to force the compacted material 28 out of the chamber 12. The compacted material 28 can be forced out of the chamber 12 in any suitable manner. In an embodiment, the compacted material 28 can be metered out at a controlled rate in order to provide an accurate feed rate of material to be used in the process at hand. Accurate metering can be accomplished by, for example, employing a motion control device to control the rate of the compacted material 28 exiting chamber 12, in combination with a feedback loop that monitors the motion or volume output of the compacted material 28 and provides feedback useful for controlling the motion control device. The compacted material 28 can be dispensed at a controlled rate in this manner until the compacted material 28 is expended, at which point additional divided material can be compacted and the process repeated.

Alternatively, a finite known volume of compacted material 28 can be ejected out of chamber 12 all at once. This can be repeated to provide a specified amount of material at periodic intervals to accomplish the desired feed rate, without controlling the volumetric rate at which each batch of compacted material 28 exits chamber 12, as was done in the process above. For example, such a metering technique could include (1) determining when a desired amount of compacted material 28 is obtained in the chamber 12, (2) ejecting the desired amount of compacted material 28 from the chamber 12 using plunger 22; and (3) repeating steps (1) and (2) a desired number of times over a set time period to provide a desired volumetric feed rate of the compacted material 28.

After the compacted material 28 is forced from the chamber 12, the compacted material 28 can be processed by any suitable means. In an embodiment, the compacted material 28 is reduced to a divided solid form using any suitable means, such as mechanical cutting, pulverizing, grinding, extrusion or by employing a high pressure water jet. Exemplary devices for reducing the compacted material 28 can include a rotary rasp, circular grinder, reciprocating grinder, or a circular or linear cutter. FIG. 4 illustrates a reducing device 30 cutting the compacted material 28, according to an embodiment of the present disclosure.

Generally speaking, it is desirable to reduce the compacted material 28 to a form that is easily mixed with the carrier fluid in which it is to be employed. For example, in the case where the compacted material 28 is a viscosifying compound that is to be used in an aqueous based well servicing fluid, it would be desirable to reduce the compacted material 28 to a form that is easily hydratable in order to allow for ease of mixing and reduce the hydration rate of the reduced material compared to the hydration rate of the compacted material 28. The compacted material 28 can be reduced to any desired form, including divided solids, such as pellets, granules, powders or flakes.

Figure 5:
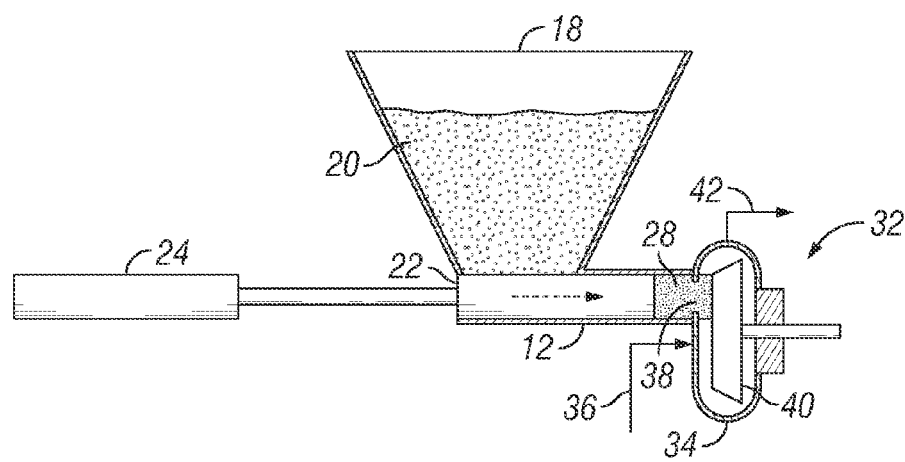
FIG. 5 illustrates the apparatus of FIGS. 1 to 3 metering the compacted material and reducing and mixing the material with a fluid in a reducing device, according to an embodiment of the present disclosure.

The reducing process can be performed on the compacted material 28 in a dry state. Alternatively, the reducing process can be performed wet. For example, as illustrated in FIG. 5, the compacted material 28 can be fed directly into a reducing device 32 configured to simultaneously reduce the compacted material 28 and mix it with a carrier fluid. The reducing device 32 can include a mixing chamber 34 comprising a fluid inlet 36 for introducing the carrier fluid, and a solid inlet 38 for introducing the compacted material 28. Mixing chamber 34 comprises a reducing mechanism 40, such as a rotary blade, grinder, extruding device or any other suitable device configured to reduce the compacted material 28. The reducing mechanism 40 may also be configured to simultaneously provide energy for mixing the reduced material with the fluid. Fluid mixed with the reduced material can then exit the mixing chamber 34 via an outlet 42.

An example of suitable reducing devices 32 can include a centrifugal pump in which an opening is machined through which the solid can be introduced and come into contact with the impeller of the centrifugal pump. The impeller shears off portions of the compacted material 28 and mixes them with the water in container 18.

Extrusion can be used to reduce the compacted material 28 by, for example, forcing the compacted material 28 through a plurality of small orifices to reduce the size of the compacted material 28 in preparation for mixing with a liquid. Prior to mixing, the extruded material could be reduced further by cutting or other means. If extrusion is employed to reduce the compacted material 28, other ingredients can potentially be added to the material, either before or after compaction, to enhance extrudability, such as wax or possibly water. Water can also be added prior to extrusion to start the process of hydration. The mechanical shear of extrusion together with the added water may be helpful in increasing the rate of hydration. In an embodiment, the compacted material 28 can be extruded either prior to or simultaneously with introducing the material into the reducing device 32.

Any combination of the above described reducing devices or techniques can be employed to reduce the compacted material 28. For example, a high pressure water jet could be employed to break up the compacted material 28, followed by further reducing and hydrating the material in the reducing device 32 of FIG. 5. Other suitable means for reducing the material and/or decreasing hydration time can also be employed in addition to or instead of the processes discussed above. For example, heat can be applied during the reducing and/or hydration process.

Figure 6:
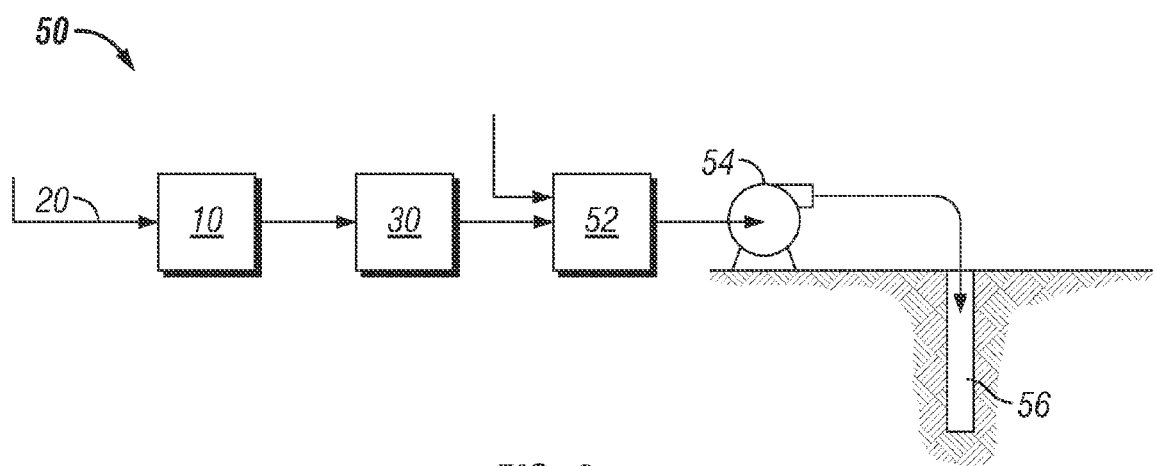
FIG. 6 illustrated a block diagram of a system for metering compacted material, reducing the compacted material and mixing the reduced material with a carrier fluid before introducing the resulting mixture into a hydrocarbon well, according to an embodiment of the present disclosure.

The present disclosure is also directed to a system for metering material and introducing the material into a hydrocarbon well. FIG. 6 illustrates a block diagram of such a system 50. System 50 comprises an apparatus 10 for compacting divided material. Any apparatus that can effectively compact the divided material can be used, including, for example, the apparatus 10 as described above. A reducing device 30 can be attached to the apparatus 10 or positioned in any suitable manner that allows for processing the compacted material 28 dispensed from the apparatus 10 to form a reduced material. A separate mixing device 52 can be employed to mix the reduced material with a carrier fluid. The mixing can occur following the reducing of the compacted material 28 by reducing device 30. In an alternative embodiment, discussed above, the mixing and reducing can occur in a single reducing device, such as reducing device 32 shown in FIG. 5. A pumping system 54, which is illustrated as a single pump but which can comprise any number of pumps and conduit for moving well servicing fluid, can be positioned in fluid communication with a hydrocarbon well 56 so as to allow the pumping system 54 to pump the material and fluid carrier mixture into the hydrocarbon well.

Prior to pumping the material and fluid carrier mixture into the well 56, additional processing can be carried out and/or additional ingredients can be added to the mixture. For example, where the material is a viscosifier and the mixture is to be used for a fracturing fluid, the viscosity of the mixture can be allowed to increase and a proppant can be added prior to introduction of the fluid into the well. Any number of other processing steps can be carried out and/or other ingredients can be added to the mixture. Further, the order of the devices illustrated in FIG. 6 can be rearranged in any suitable manner.

Although various embodiments have been shown and described, the present disclosure is not so limited and will be understood to include all such modifications and variations as would be apparent to one skilled in the art.

What is claimed is:

1. A process for metering a material, the process comprising:

providing in a container a divided material having a bulk density;

providing a portion of the divided material from the container into a chamber having a first end and a second end, the second end having a valve that is selectively openable and closeable;

compacting the portion of the divided material using a plunger moving from the first end within the chamber against the valve with the valve closed, until the material reaches a second density that is greater than the bulk density;

actuating the valve to open the chamber at the second end;

metering a desired amount of the compacted material out of the chamber through the second end using the plunger;

combining the compacted material with a carrier fluid to form a mixture; and introducing the mixture into a hydrocarbon well.

2. The process of claim 1, further comprising processing the compacted material after the metering to allow for an increased hydration rate of the processed material compared to the hydration rate of the compacted material.

3. The process of claim 2, wherein the processing comprises reducing the compacted material into a form chosen from the group consisting of powders, flakes, granules and pellets.

4. The process of claim 2, wherein the processing comprises extruding the compacted material.

5. The process of claim 1, wherein the divided material comprises a polymer.

6. The process of claim 5, wherein the polymer is chosen from the group consisting of viscosifying polymers, friction flow control polymers and fluid loss control polymers.

7. The process of claim 5, wherein the polymer is chosen from polysaccharides, polyvinyl alcohol, polyimide, polyamine, quaternary polyamine, quaternary ammonium polymer, polyacrylate, polypyrrolidone, polyacrylamide and mixtures thereof.

8. The process of claim 5, wherein the divided polymer material has a first volume of air and the compacted polymer has a second volume of air, the second volume of air being about 20% of the first volume of air or less.

9. The process of claim 1, wherein the compacted material is a solid or semi-solid.

10. The process of claim 1, wherein compacting comprises:

initially compacting a first amount of divided material into the chamber to partially fill the chamber with compacted material;

compacting an additional amount of divided material into the chamber to increase the amount of compacted material in the chamber; and repeating the compacting of additional amounts of divided material until a desired volume of compacted material is obtained in the chamber.

11. The process of claim 10, wherein metering the volume of compacted material comprises metering the rate at which the compacted material exits the chamber.

12. The process of claim 10, wherein metering the volume of compacted material comprises (1) determining when a desired amount of compacted material is obtained in the chamber, (2) ejecting the desired amount of compacted material from the chamber; and (3) repeating steps (1) and (2) a desired number of times over a set period of time.

13. The process of claim 1, further comprising closing the valve to close the chamber at one end after metering the desired amount of the compacted material out of the chamber.

14. The process of claim 3, wherein reducing the compacted material comprises cutting the compacted material with a reducing device chosen from the group consisting of a rotary rasp, a circular grinder, a reciprocating grinder, a circular or linear cutter and a high pressure water jet.

15. The process of claim 1, wherein combining the compacted material with the carrier fluid further comprises:

feeding the compacted material directly into a solid inlet of a mixing chamber of a reducing device;

introducing the carrier fluid into the mixing chamber through a fluid inlet; and physically contacting and reducing the compacted material with a reducing mechanism in the mixing chamber while mixing the compacted material with the carrier fluid.

16. The process of claim 15, wherein the reducing device comprises an impellor of a centrifugal pump.

17. The process of claim 1, wherein compacting the portion of the divided material within the chamber comprises compacting the divided material at least to a pressure above which the divided material does not significantly increase in density.

\* \* \* \* \*